(12) United States Patent
Wu et al.

(10) Patent No.: US 8,081,599 B2
(45) Date of Patent: Dec. 20, 2011

(54) DYNAMIC AND FAIR RESOURCE ALLOCATION ALGORITHM FOR OFDM SYSTEMS

(75) Inventors: Tsan-Ming Wu, Tao-Yuan (TW); Szu-Liang Wang, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 647 days.

(21) Appl. No.: 12/210,450

(22) Filed: Sep. 15, 2008

(65) Prior Publication Data

US 2010/0067447 A1   Mar. 18, 2010

(51) Int. Cl.
*H04W 4/00* (2009.01)

(52) U.S. Cl. ........................ 370/329; 370/333

(58) Field of Classification Search .............. 370/208, 370/328; 375/260
See application file for complete search history.

(56) References Cited

U.S. PATENT DOCUMENTS

| | | | |
|---|---|---|---|
| 2006/0083157 A1* | 4/2006 | Cheng et al. | 370/208 |
| 2009/0161603 A1* | 6/2009 | Cheng et al. | 370/328 |
| 2009/0310692 A1* | 12/2009 | Kafle et al. | 375/260 |

* cited by examiner

*Primary Examiner* — Kwang B Yao
*Assistant Examiner* — Syed M Bokhari
(74) *Attorney, Agent, or Firm* — WPAT., P.C.; Justin King

(57) ABSTRACT

A resource allocation with dynamic bit control to achieve the greatest fairness for all users and minimize transmission power over orthogonal frequency division multiplexing (OFDM) systems is presented. This technique can be also applied in WiMAX system.

9 Claims, 6 Drawing Sheets while $U \neq \emptyset$ or $S \neq \emptyset$, do
    for $u_k$, $k = 1, 2, \cdots, K$, $u_k \in U$
        $n^* = \arg\max_{s_n \in S} |\alpha_{k,n}|$.
        $G_k = G_k \cup \{s_{n^*}\}$, $S = S \setminus \{s_{n^*}\}$.
        If $\sum_{s_n \in G_k} r_{k,n} \geq R_k$, $U = U \setminus \{u_k\}$.
    end for
end while

FIG. 1

$$\text{while } U \neq \emptyset, \text{ do}$$

$$u_{k^*} = \arg\max_{u_k \in U} p_k.$$

$$s_{n^*} = \arg\min_{s_n \in G_{k^*}} |\alpha_{k^*,n}|, \quad j^* = \arg\max_{j \in J} |\alpha_{k^*,j}|.$$

$$\frac{\alpha_{k^*,n^*}}{\alpha_{k^*,j^*}} \cong \frac{r_{k^*,n^*} - r_{k^*,j^*}}{r_{k^*,j^*}}, \quad r_{k^*,n^*} = r_{k^*,n^*} - r_{k^*,j^*}.$$

$$P_{e'} = 4Q\left(\sqrt{\frac{3p_{k^*}}{N_0}\sum_{n=1}^{N}\frac{\alpha_{k^*,n}^2}{(2^{r_{k^*,n}}-1)}}\right).$$

$$\text{if } P_{e'} \leq P_e, \quad G_{k^*} = G_{k^*} \cup \{j^*\}, \quad J = J \setminus \{j^*\}.$$

$$\text{update } p_{k^*}, \quad G_{k^*} = G_{k^*} \setminus \{s_{n^*}, j^*\}.$$

$$\text{else, } G_{k^*} = G_{k^*} \setminus \{s_{n^*}\}.$$

$$\text{if } G_{k^*} = \emptyset, \quad U = U \setminus \{k^*\}.$$

end while

FIG. 5

DYNAMIC AND FAIR RESOURCE ALLOCATION ALGORITHM FOR OFDM SYSTEMS

BACKGROUND OF THE INVENTION

1. Field of the Invention

The present invention generally relates to dynamic and fair resource allocation algorithm for OFDM systems.

2. Description of the Prior Art

Orthogonal Frequency-Division Multiplexing (OFDM) for multiple users has become a crucial scheme for the next-generation wireless communication. One of the characteristics for OFDM is that all the sub-carriers carrying data are orthogonal to each other. If the channel-state information (CSI) can be known perfectly, sub-carriers carrying data bits can achieve the best efficiency while maintaining fairness. A variety of methods have thus far been proposed to address these issues.

One method has been proposed by D. Kivanc, G. Li and H. Liu, titled "Computationally efficient bandwidth allocation and power control for OFDMA," IEEE Trans. Wireless commun., vol. 2, pp. 1150-1158, November 2003, which allocates a suitable amount of sub-carriers to each user, and then decides which sub-carrier is to be allocated to a specific user. Such technique is computationally efficient, but very power consuming. In addition, if the overall bandwidth cannot satisfy all users, then users demanding lower data rates are sacrificed in order for the rest to continue. In terms of QoS, this technique is not fair.

In addition, a publication authored by T.-D. Nguyen and Y. Han, titled "A dynamic channel assignment algorithm for OFDMA systems," in Proc. IEEE Veh. Technol. Conf.k September 2006 pp. 1-5, has proposed a dynamic channel assignment algorithm that makes a compromise between system output and fairness. However, this is based on the assumption that the allocation of the sub-carriers are of equal power distribution. This is unfavorable in terms of power consideration. Therefore, there is a need for a method that achieves better and fairer resource allocation while reducing transmission power.

SUMMARY OF THE INVENTION

In view of the prior art and the needs of the related industries, the present invention provides that solves the above-mentioned shortcomings of the conventional.

One objective of the present invention is to provide a method for fair sub-carriers allocation for an OFDM system, as shown in FIG. 3. First, as shown in step 310, data transmission rates requested by a plurality of users are obtained. Next, as shown in step 320, a user sequence is generated based on the data transmission rates requested by the plurality of users, wherein the user after the last user in the user sequence is the first user in the user sequence. Thereafter, in step 330, a sub-carrier group having a plurality of sub-carriers is obtained. Then, in step 340, an allocated user is sequentially selected from the user sequence and an allocation process is performed for the allocated user until there are no more users in the user sequence or sub-carriers in the sub-carrier group.

The above allocation process is shown in FIG. 4. First, in step 341, a sub-carrier with the largest response in the sub-carrier group is allocated to the allocated user. Thereafter, as shown in step 342, the sub-carrier with the largest response is removed from the sub-carrier group. Next, in step 343, when the sum of data transmission rates of all the sub-carriers allocated to the allocated user is larger than that requested by the allocated user, then the allocated user is removed from the user sequence.

One objective of the present invention is to provide a method for dynamic bit assignment for an OFDM system, as shown in FIG. 6. This OFDM system allocated enough sub-carrier(s) to each user in a user group based on the data transmission rates requested by the respective user, thus forming a user-sub-carrier group. An unallocated sub-carrier group including a plurality of sub-carriers is also provided.

First, as shown in step 610, sub-carrier(s) is/are allocated to each user in the user group, forming a user-sub-carrier group. Next, as shown in step 620, a user with the highest sum of transmission rates is selected from the user group as an assigned user. Next, in step 630, a sub-carrier with the lowest response is selected from the user-sub-carrier group allocated to the assigned user as a first assigned sub-carrier. Then, in step 640, a sub-carrier with the highest response is selected from the unallocated sub-carrier group for the assigned user as a second assigned sub-carrier. Thereafter, as shown in step 650, the BER for the assigned user is calculated when a portion of the data carried by the first assigned sub-carrier is assigned to the second assigned sub-carrier, the result being an assigned BER. Then, in step 660, when the assigned BER is lower than a predetermined BER, the portion of the data carried by the first assigned sub-carrier is assigned to the second assigned sub-carrier; the second assigned sub-carrier is allocated to the assigned user; and the second assigned sub-carrier is then removed from the unallocated sub-carrier group. Then, as shown in step 680, when there are no more sub-carriers in the user-sub-carrier group of the assigned user, the assigned user is removed from the user group. Finally, in step 690, when the user group includes at least one user, the process returns back to step 620.

Furthermore, in an example of the present invention, step 690 returns to step 620 when the unallocated sub-carrier group includes at least one sub-carrier. Additionally, as for the assigned user, based on the proportion of the response of the first assigned sub-carrier to that of the second assigned sub-carrier, a portion of the data originally carried by the first assigned sub-carrier is assigned to the second assigned sub-carrier.

BRIEF DESCRIPTION OF THE DRAWINGS

The accompanying drawings incorporated in and forming a part of the specification illustrate several aspects of the present invention, and together with the description serve to explain the principles of the disclosure. In the drawings:

FIG. 1 is a diagram illustrating an algorithm for sub-carrier allocation;

FIG. 5 is a diagram illustrating a dynamic bit assignment algorithm for an OFDM system according to the present invention.

DETAILED DESCRIPTION OF THE PREFERRED EMBODIMENTS

Assuming that receiving and transmitting ends are both aware of the transmission channel state information, the dynamic resource allocation algorithm proposed by the present invention considers two situations: one with sufficient bandwidth and the other with insufficient bandwidth due to too many users. In the situation where bandwidth is sufficient, each user can be allocated with a required bandwidth. At this time, the present invention uses the remaining bandwidth to minimize the transmission power for the overall system under an acceptable BER. On the other hand, if there are too many users such that the bandwidth is not enough for allocation, then each user will be allocated a bandwidth in a fair way without being interrupted.

As such, one embodiment of the present invention is a method for fair sub-carriers allocation for an OFDM system. As shown in FIG. 1, assuming there are K users and N sub-carriers in the OFDM system. The user set is defined as $U=\{u_k|k=1,2,\Lambda,K\}$, which is arranged according to the data transmission rates of each user, that is $R_1 \geq R_2 \geq \Lambda \geq R_K$, where $R_k$ indicates the data transmission rate of the $k_{th}$ user. Thus, the user set can be regarded as a user sequence. The sub-carrier set is further defined as $S=\{S_n|n=1,2,\Lambda,N\}$, and the sub-carrier set allocated to the $k_{th}$ user is $G_k=\{S_n|n\in S\}$, where $k=1,2,\ldots,K$.

Furthermore, $r_{k,n}$ indicates the number of data bits carried by the $n_{th}$ sub-carrier for the $k_{th}$ user. Thus, $r_{k,n}=0$ means that the $n_{th}$ sub-carrier is not allocated to the $k_{th}$ user. In addition, $f(r_{k,n})$ indicates the power-bit function of the $n_{th}$ sub-carrier carrying $r_{k,n}$ bits for the $k_{th}$ user. Thus, the transmission power for the $k_{th}$ user can be expressed as follows:

$$p_k = \sum_{n=1}^{N} p_{k,n} = \sum_{n=1}^{N} \frac{f(r_{k,n})}{\alpha_{k,n}^2}. \quad (1)$$

The algorithm for sub-carriers allocation is shown in FIG. 1.

In FIG. 1, union and difference operand are denoted by "U" and "\", respectively. In addition, "∅" denotes an empty set. The above sub-carriers are allocated to a user one by one to ensure the fairness of QoS.

Figure 2:
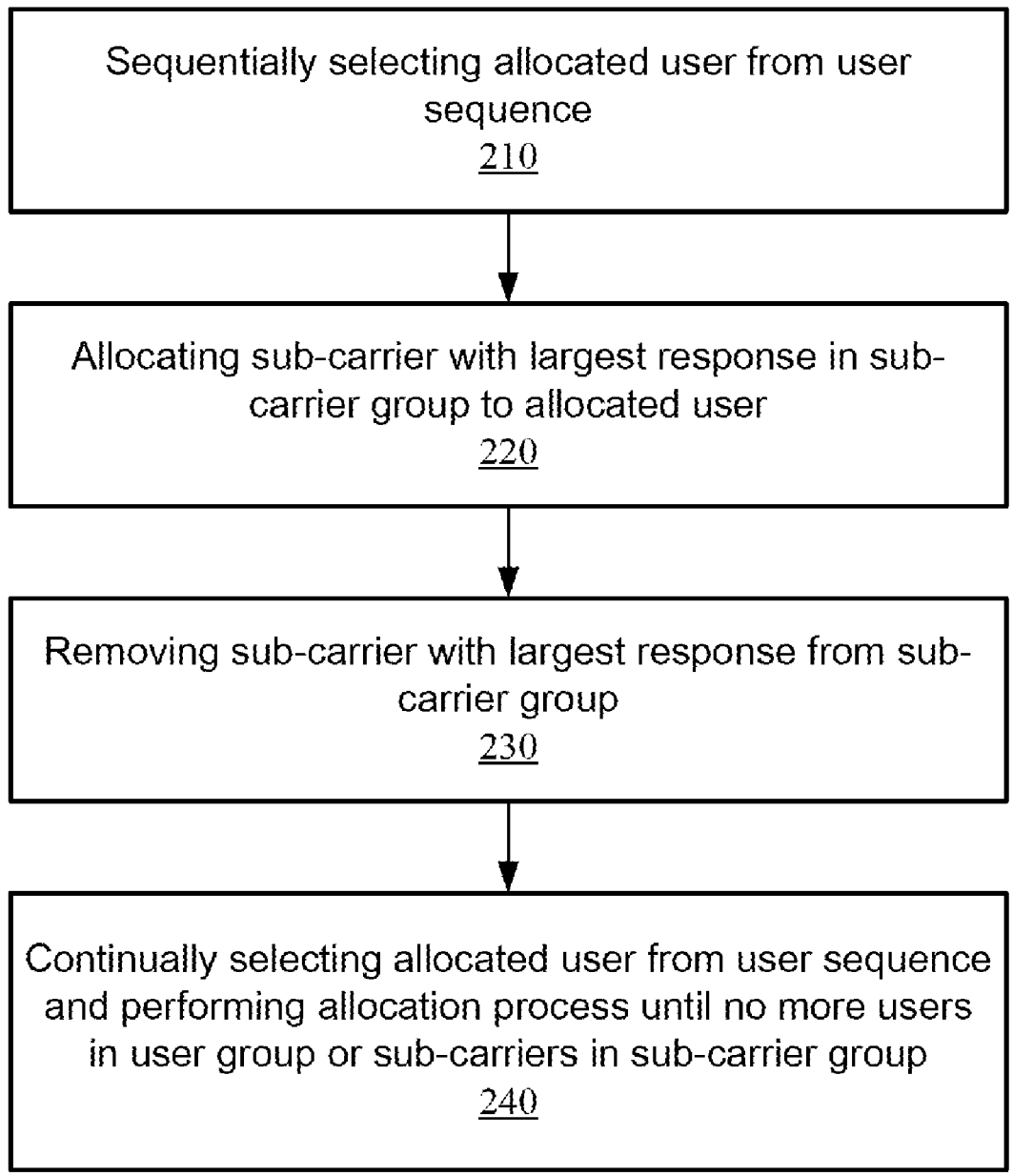
FIGS. 2, 3 and 4 are flowcharts illustrating embodiments of a method for fair sub-carrier allocation for an OFDM system according to the present invention.

As such, a first embodiment of the present invention is a method for fair sub-carriers allocation for an OFDM system, as shown in FIG. 2. This OFDM system provides a group of sub-carriers to a plurality of users in a user sequence for data transmission, wherein the plurality of users are arranged according to their requested data transmission rates in a descending order. As shown in step 210, an allocated user is sequentially selected from the user sequence, wherein the next user after the last user in the user sequence is the first user in the user sequence.

In step 220, a sub-carrier with the largest response in the sub-carrier group is allocated to the allocated user. Thereafter, as shown in step 230, the sub-carrier with the largest response is removed from the sub-carrier group. Next, in step 240, when the sum of data transmission rates of all the sub-carriers allocated to the allocated user is larger than that requested by the allocated user, then the allocated user is removed from the user sequence. Finally, in step 250, when the user sequence includes at least one user, the process returns back to step 210.

In addition, before any sub-carrier is allocated to a user, the total number of sub-carriers in the sub-carrier group is larger than the total number of users in the user sequence. Furthermore, the sum of data transmission rates of all the sub-carriers in the sub-carrier group is larger than that requested by all the users in the user sequence.

Figure 3:
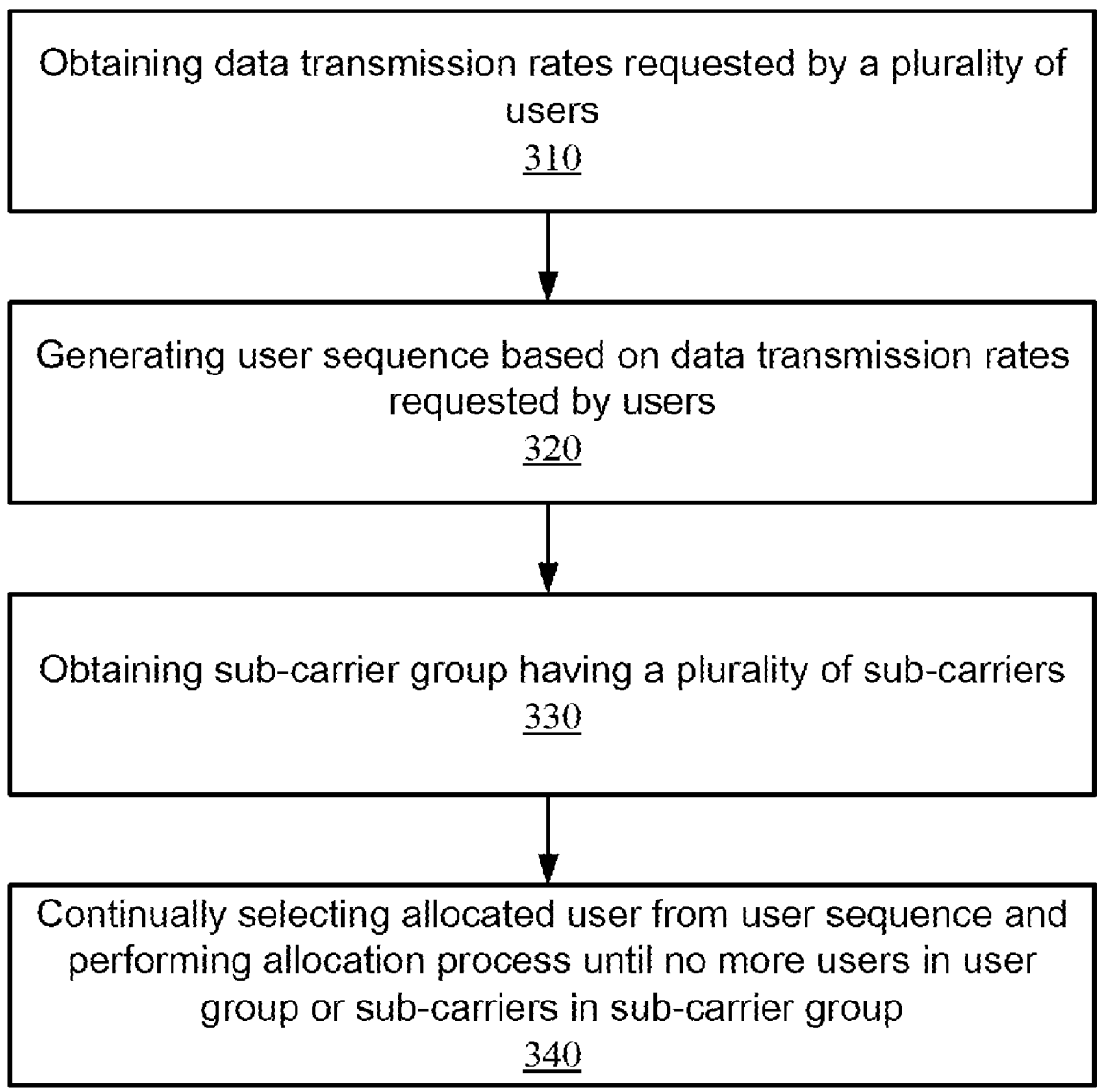

As such, a second embodiment of the present invention is a method for fair sub-carriers allocation for an OFDM system, as shown in FIG. 3. First, as shown in step 310, data transmission rates requested by a plurality of users are obtained. Next, as shown in step 320, a user sequence is generated based on the data transmission rates requested by the plurality of users, wherein the user after the last user in the user sequence is the first user in the user sequence. Thereafter, in step 330, a sub-carrier group having a plurality of sub-carriers is obtained. Then, in step 340, an allocated user is sequentially selected from the user sequence and an allocation process is performed for the allocated user until there are no more users in the user sequence or sub-carriers in the sub-carrier group.

Figure 4:
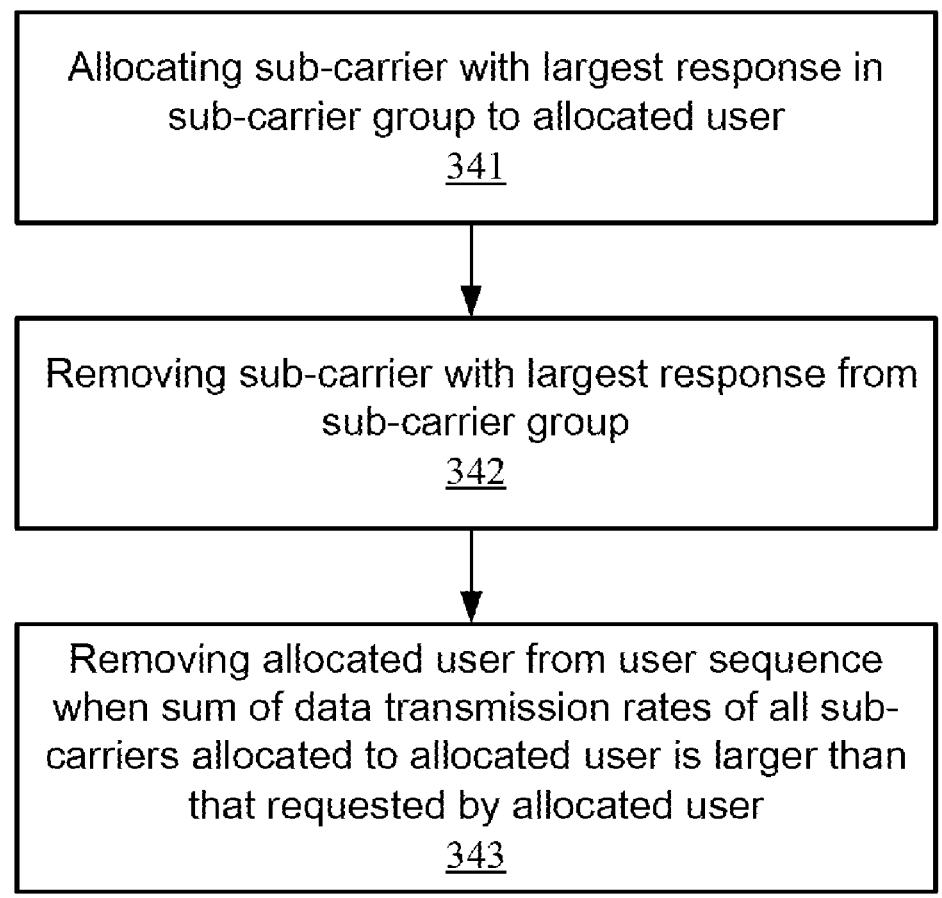

The above allocation process is shown in FIG. 4. First, in step 341, a sub-carrier with the largest response in the sub-carrier group is allocated to the allocated user. Thereafter, as shown in step 342, the sub-carrier with the largest response is removed from the sub-carrier group. Next, in step 343, when the sum of data transmission rates of all the sub-carriers allocated to the allocated user is larger than that requested by the allocated user, then the allocated user is removed from the user sequence.

In M-ary quadrature amplitude modulation scheme, under a given predetermined bit error rate (BER) $P_e$, the average power-bit function (referring to C. Y. Wong, R. S. Cheng, K. B. Letaief, and R. D. Murch, "Multiuser OFDM with adaptive subcarrier, bit, and power allocation," IEEE J. Sel. Areas Commun., vol. 17, pp. 1747-1758, October 1999.) is as follows:

$$f(r) = \frac{N_0}{3}(M-1)\left[Q^{-1}\left(\frac{P_e}{4\left(1-\frac{1}{\sqrt{M}}\right)}\right)\right]^2 \approx \frac{N_0}{3}(2^r - 1)\left[Q^{-1}\left(\frac{P_e}{4}\right)\right]^2, \quad (2)$$

wherein $N_O$ indicates the single-sided power spectral density, and $$Q(x) = \frac{1}{\sqrt{2\pi}} \int_x^{\infty} \exp\left(-\frac{u^2}{2}\right) du.$$

Since that the power-bit function must satisfy the predetermined BER $P_e$ and number of bits r, the remaining unallocated sub-carriers can be used to reduce the transmission rate.

Accordingly, given the predetermined BER $P_e$, the transmission power for the $k_{th}$ user can be re-expressed as follows:

$$p_k = \sum_{n=1}^{N} p_{k,n} = \sum_{n=1}^{N} \frac{\frac{N_0}{3}(2^{4k,n}-1)\left[Q^{-1}\left(\frac{P_e}{4}\right)\right]^2}{\alpha_{k,n}^2}, \quad (3)$$

From equation (3), it can be seen that the transmission power $P_{k,n}$ is proportional to the number of bits carried $r_{k,n}$. Therefore, reducing the number of bits carried can significantly reduced the transmission power. Assuming $J=S\setminus(G_1 \cup G_2 \cup \Lambda \otimes G_K)$ is the unallocated sub-carrier set, the dynamic bit assignment algorithm for an OFDM system according to the present invention is shown in FIG. 5.

Figure 6:
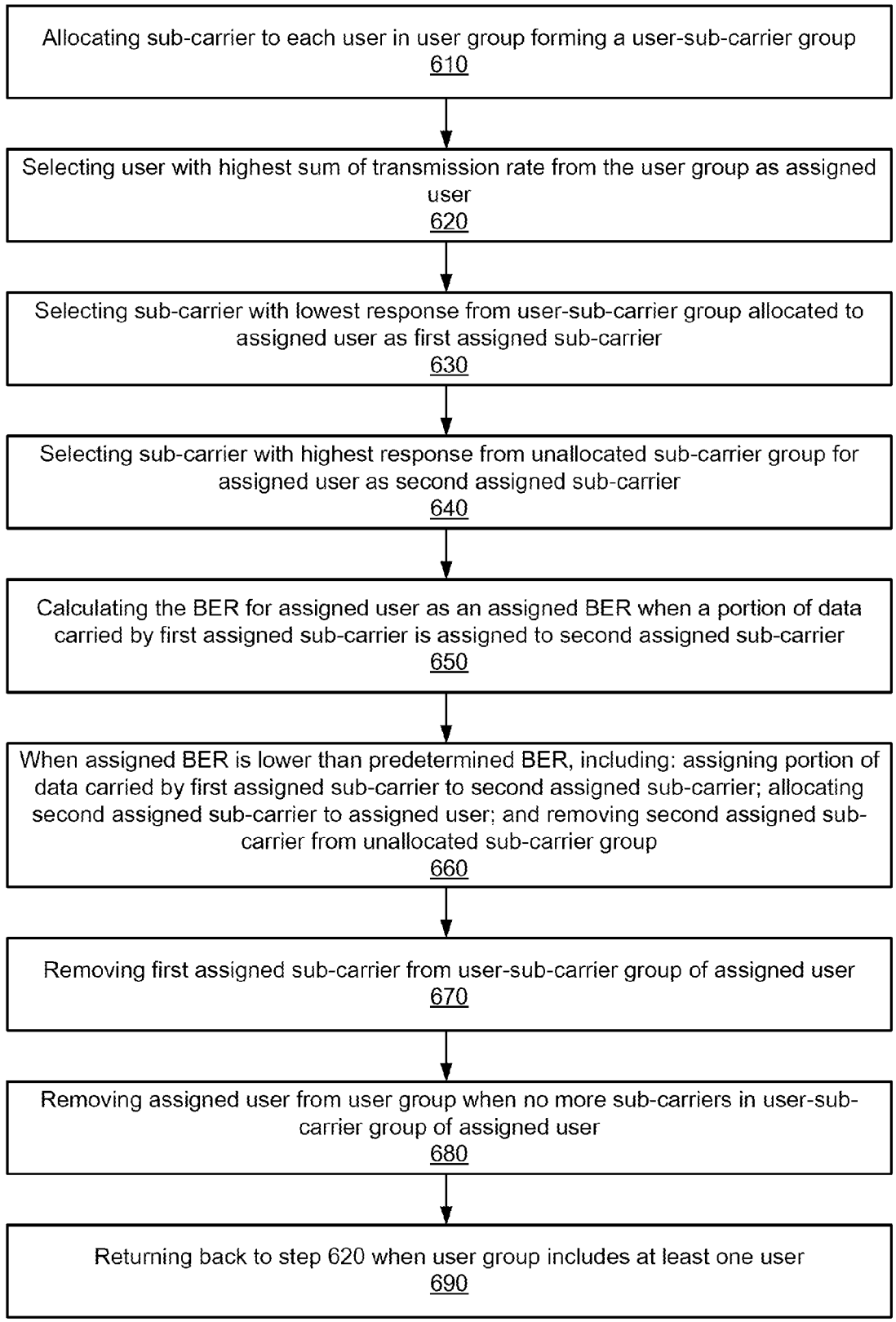
FIG. 6 is a flowchart illustrating an embodiment of a method for dynamic bit assignment for an OFDM system according to the present invention.

As such, a third embodiment of the present invention is a method for dynamic bit assignment for an OFDM system, as shown in FIG. 6. This OFDM system allocated enough sub-carrier(s) to each user in a user group based on the data transmission rates requested by the respective user, thus forming a user-sub-carrier group. An unallocated sub-carrier group including a plurality of sub-carriers is also provided.

First, as shown in step 610, sub-carrier(s) is/are allocated to each user in the user group, forming a user-sub-carrier group. Next, as shown in step 620, a user with the highest sum of transmission rates is selected from the user group as an assigned user. Next, in step 630, a sub-carrier with the lowest response is selected from the user-sub-carrier group allocated to the assigned user as a first assigned sub-carrier. Then, in step 640, a sub-carrier with the highest response is selected from the unallocated sub-carrier group for the assigned user as a second assigned sub-carrier. Thereafter, as shown in step 650, calculates the BER for the assigned user when a portion of the data carried by the first assigned sub-carrier is assigned to the second assigned sub-carrier, the result being an assigned BER. Then, in step 660, when the assigned BER is lower than a predetermined BER, the portion of the data carried by the first assigned sub-carrier is assigned to the second assigned sub-carrier; the second assigned sub-carrier is allocated to the assigned user; and the second assigned sub-carrier is then removed from the unallocated sub-carrier group. Then, as shown in step 680, when there are no more sub-carriers in the user-sub-carrier group of the assigned user, the assigned user is removed from the user group. Finally, in step 690, when the user group includes at least one user, the process returns back to step 620.

Furthermore, in an example of the present invention, step 690 returns to step 620 when the unallocated sub-carrier group includes at least one sub-carrier. Additionally, as for the assigned user, based on the proportion of the response of the first assigned sub-carrier to that of the second assigned sub-carrier, a portion of the data originally carried by the first assigned sub-carrier is assigned to the second assigned sub-carrier.

As such, a fourth embodiment of the present invention is a method for fair sub-carrier allocation and dynamic bit assignment for an OFDM system, which includes: obtaining data transmission rates requested by a plurality of users; generating a user sequence based on the data transmission rates requested by the plurality of users, wherein the user after the last user in the user sequence is the first user in the user sequence; obtaining a sub-carrier group having a plurality of sub-carriers; continually and sequentially selecting an allocated user from the user sequence, and performing an allocation process for the allocated user until there are no more users in the user sequence or sub-carriers in the sub-carrier group; allocating sub-carrier(s) to each user in the user group to form a user-sub-carrier group; and continually performing an assignment process when the user group includes at least one user.

The above allocation process includes: allocating a sub-carrier with the largest response in the sub-carrier group to the allocated user; removing the sub-carrier with the largest response from the sub-carrier group; removing the allocated user from the user sequence when the sum of data transmission rates of all the sub-carriers allocated to the allocated user is larger than that requested by the allocated user.

In addition, the above assignment process includes: selecting a user with the highest sum of transmission rates from the user group as an assigned user; selecting a sub-carrier with the lowest response from the user-sub-carrier group allocated to the assigned user as a first assigned sub-carrier; selecting a sub-carrier with the highest response from the unallocated sub-carrier group for the assigned user as a second assigned sub-carrier; calculating the BER for the assigned user when a portion of the data carried by the first assigned sub-carrier is assigned to the second assigned sub-carrier, the result being an assigned BER; assigning the portion of the data carried by the first assigned sub-carrier to the second assigned sub-carrier when the assigned BER is lower than a predetermined BER; allocating the second assigned sub-carrier to the assigned user when the assigned BER is lower than a predetermined BER; and then removing the second assigned sub-carrier from the unallocated sub-carrier group when the assigned BER is lower than a predetermined BER; removing the first assigned sub-carrier from the user-sub-carrier group of the assigned user; and removing the assigned user from the user group when there are no more sub-carriers in the user-sub-carrier group of the assigned user.

The relevant details of this embodiment have been disclosed earlier and will not be further described.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A method for fair sub-carrier allocation and dynamic bit allocation for an orthogonal frequency-division multiplexing (OFDM) system, comprising:

obtaining data transmission rates requested by a plurality of users; generating a user sequence based on the data transmission rates requested by the plurality of users, wherein the user after the last user in the user sequence is the first user in the user sequence; obtaining a sub-carrier group having a plurality of sub-carriers; continually and sequentially selecting an allocated user from the user sequence, and performing an allocation process for the allocated user until there are no more users in the user sequence or sub-carriers in the sub-carrier group, the allocation process including:

allocating a sub-carrier with the largest response in the sub-carrier group to the allocated user; removing the sub-carrier with the largest response from the sub-carrier group; removing the allocated user from the user sequence when the sum of the data transmission rates of all the sub-carriers allocated to the allocated user is larger than that requested by the allocated user; allocating at least one sub-carrier to each user in the user group to form a user-sub-carrier group; and continually performing an assignment process when the user group includes at least one user, the assignment process including:

selecting a user with the highest sum of transmission rates from the user group as an assigned user; selecting a sub-carrier with the lowest response from the user-sub-carrier group allocated to the assigned user as a first assigned sub-carrier; selecting a sub-carrier with the highest response from the unallocated sub-carrier group for the assigned user as a second assigned sub-carrier; calculating the bit error rate (BER) for the assigned user when a portion of the data carried by the first assigned sub-carrier is assigned to the second assigned sub-carrier, the result being an assigned BER; when the assigned BER is lower than a predetermined BER, including:

assigning the portion of the data carried by the first assigned sub-carrier to the second assigned sub-carrier; allocating the second assigned sub-carrier to the assigned user; and then removing the second assigned sub-carrier from the unallocated sub-carrier group;

removing the first assigned sub-carrier from the user-sub-carrier group of the assigned user; and removing the assigned user from the user group when there are no more sub-carriers in the user-sub-carrier group of the assigned user.

2. The method of claim 1, wherein, for the assigned user, based on the proportion of the response of the first assigned sub-carrier to that of the second assigned sub-carrier, the portion of the data carried by the first assigned sub-carrier is assigned to the second assigned sub-carrier.

3. The method of claim 1, wherein before any sub-carrier is allocated to a user, the total number of sub-carriers in the sub-carrier group is larger than the total number of users in the user sequence.

4. The method of claim 1, wherein the sum of the data transmission rates of all the sub-carriers in the sub-carrier group is larger than that requested by all the users in the user sequence.

5. A method for dynamic bit allocation for an orthogonal frequency-division multiplexing (OFDM) system, the OFDM system allocating enough sub-carriers to each user in a user sequence based on their data transmission rates, forming a user-sub-carrier group, and further providing an unallocated sub-carrier group having a plurality of sub-carriers, the dynamic bit assignment method comprising:
   A. allocating at least one sub-carrier to each user in the user group to form a user-sub-carrier group;
   B. selecting a user with the highest sum of transmission rates from the user group as an assigned user;
   C. selecting a sub-carrier with the lowest response from the user-sub-carrier group allocated to the assigned user as a first assigned sub-carrier;
   D. selecting a sub-carrier with the highest response from the unallocated sub-carrier group for the assigned user as a second assigned sub-carrier;
   E. calculating the bit error rate (BER) for the assigned user when a portion of the data carried by the first assigned sub-carrier is assigned to the second assigned sub-carrier, the result being an assigned BER;
   F. when the assigned BER is lower than a predetermined BER, including:
      assigning the portion of the data carried by the first assigned sub-carrier to the second assigned sub-carrier;
      allocating the second assigned sub-carrier to the assigned user; and
      removing the second assigned sub-carrier from the unallocated sub-carrier group;
   G. removing the first assigned sub-carrier from the user-sub-carrier group of the assigned user;
   H. removing the assigned user from the user group when there are no more sub-carriers in the user-sub-carrier group of the assigned user; and
   I. returning to step B when the user group includes at least one user.

6. The method of claim 5, wherein step I returns to step B when the unallocated sub-carrier group includes at least one sub-carrier.

7. The method of claim 5, wherein, for the assigned user, based on the proportion of the response of the first assigned sub-carrier to that of the second assigned sub-carrier, the portion of the data carried by the first assigned sub-carrier is assigned to the second assigned sub-carrier.

8. A method for dynamic bit allocation for an orthogonal frequency-division multiplexing (OFDM) system, the OFDM system allocating enough sub-carriers to each user in a user sequence based on their data transmission rates, forming a user-sub-carrier group, and further providing an unallocated sub-carrier group having a plurality of sub-carriers, the dynamic bit assignment method comprising:
   allocating at least one sub-carrier to each user in the user group to form a user-sub-carrier group; and continually performing an assignment process when the user group includes at least one user, the assignment process including:
   selecting a user with the highest sum of transmission rates from the user group as an assigned user; selecting a sub-carrier with the lowest response from the user-sub-carrier group allocated to the assigned user as a first assigned sub-carrier; selecting a sub-carrier with the highest response from the unallocated sub-carrier group for the assigned user as a second assigned sub-carrier; calculating the bit error rate (BER) for the assigned user when a portion of the data carried by the first assigned sub-carrier is assigned to the second assigned sub-carrier, the result being an assigned BER; when the assigned BER is lower than a predetermined BER, including:
   assigning the portion of the data carried by the first assigned sub-carrier to the second assigned sub-carrier; allocating the second assigned sub-carrier to the assigned user; and removing the second assigned sub-carrier from the unallocated sub-carrier group; removing the first assigned sub-carrier from the user-sub-carrier group of the assigned user; and removing the assigned user from the user group when there are no more sub-carriers in the user-sub-carrier group of the assigned user.

9. The method of claim 8, wherein, for the assigned user, based on the proportion of the response of the first assigned sub-carrier to that of the second assigned sub-carrier, the portion of the data carried by the first assigned sub-carrier is assigned to the second assigned sub-carrier.

* * * * *